US012519801B2

(12) United States Patent
Sauvage et al.

(10) Patent No.: US 12,519,801 B2
(45) Date of Patent: Jan. 6, 2026

(54) METHOD AND SYSTEM FOR PROVIDING UNIFIED ACCESS TO SERVICE PROVIDERS

(71) Applicant: OVH, Roubaix (FR)

(72) Inventors: Pierre-Jean Sauvage, Marquette-lez-Lille (FR); Nicolas Fournier, Esnoms Au Val (FR); Inesse Ben Zekri, Rennes (FR); Vincent Casse, Doudeville (FR)

(73) Assignee: OVH, Roubaix (FR)

( * ) Notice: Subject to any disclaimer, the term of this patent is extended or adjusted under 35 U.S.C. 154(b) by 44 days.

(21) Appl. No.: 18/620,355

(22) Filed: Mar. 28, 2024

(65) Prior Publication Data

US 2024/0333724 A1  Oct. 3, 2024

(30) Foreign Application Priority Data

Mar. 30, 2023  (EP) .................................... 23305458

(51) Int. Cl.
  *H04L 9/40* (2022.01)
  *G06F 9/54* (2006.01)

(52) U.S. Cl.
  CPC ............ *H04L 63/105* (2013.01); *G06F 9/547* (2013.01)

(58) Field of Classification Search
  CPC . H04L 63/105; H04L 63/0815; H04L 63/102; H04L 63/20; H04L 63/0884; G06F 9/547
  See application file for complete search history.

(56) References Cited

U.S. PATENT DOCUMENTS

| | | | | |
|---|---|---|---|---|
| 2009/0119395 | A1* | 5/2009 | Kodama ............... | G06F 16/252 709/223 |
| 2013/0007845 | A1* | 1/2013 | Chang .................. | H04L 63/104 726/4 |
| 2016/0294813 | A1* | 10/2016 | Zou ...................... | H04L 63/0815 |
| 2020/0007530 | A1 | 1/2020 | Mohamad et al. | |
| 2022/0014510 | A1* | 1/2022 | Polish ...................... | G06N 5/04 |

(Continued)

FOREIGN PATENT DOCUMENTS

EP  3429156 A1  1/2019

OTHER PUBLICATIONS

European Search Report with regard to the EP Patent Application No. EP 23305458.4 completed Aug. 28, 2023.

(Continued)

*Primary Examiner* — El Hadji M Sall
(74) *Attorney, Agent, or Firm* — BCF LLP (57) ABSTRACT

There is disclosed a method and system for providing, by a cloud provider to a customer, a unified access by a user of the customer to a service provider hosted by the cloud provider, where the customer establishes a trusted relationship with an identity provider. An administrator populates a policy register with a first policy associated with a user. The service provider delegates the user authentication and authorization to a unified access provider. The unified access provider delegates the user authentication to the identify provider. The unified access provider receives user identify information authenticated by the identify provider. The unified access provider adapts the user identify information to include an approved role. The unified access provider sends the adapted user identify information to the service provider.

16 Claims, 7 Drawing Sheets

(56) References Cited

U.S. PATENT DOCUMENTS

2022/0224535 A1 7/2022 Coffing
2024/0031371 A1* 1/2024 Batni .................... H04L 63/102

OTHER PUBLICATIONS

Indu et al., "Identity and access management in cloud environment: Mechanisms and challenges", Engineering Science and Technology, an International Journal, vol. 21, Issue 4, 2018, 15 pages.

* cited by examiner

METHOD AND SYSTEM FOR PROVIDING UNIFIED ACCESS TO SERVICE PROVIDERS

CROSS-REFERENCE TO RELATED APPLICATIONS

The present application claims priority to European Patent Application No. 23305458.4, filed on Mar. 30, 2023, entitled "Method and System for Providing Unified Access to Service Providers," which is incorporated herein by reference in its entirety.

FIELD

The present technology relates to user access to hosted computing resources, and more particularly to a method and system for providing, by a cloud provider to a customer, a unified access by a user of the customer to a service provider.

BACKGROUND

Providing cloud services typically involves on the part of the cloud provider: hosting for a customer $3^{rd}$ party software and applications which may be open sourced or proprietary, and adopting for such hosted infrastructure an architecture chosen by the customer with technical options that the cloud provider is not at liberty to modify.

Such a situation arises with the management of customer personnel's access to such hosted $3^{rd}$ party software and applications, a critical point of organizational IT security: typically customers centralize user access authentication in an "identity provider" (or as is otherwise known: "authorization server", etc.), often using as part of their architecture one of, or both of, known login standards and federation protocols OpenID Connect (OIDC) and Security Assertion Markup Language (SAML). Both protocols offer Single Sign-On (SSO) login, while standardizing the interaction between the identity provider managed through the customer infrastructure, and the software and applications hosted by the cloud provider. In a nutshell, a given user signs on to the identity provider, which sends to the cloud provider information related to the given user's profile, then the cloud provider, after checks and verification, delegates authentication to the identity provider and opens a session of the corresponding software or application for the given user.

In such a situation, the adopted identity provider is often chosen by the customer, for example, as are available on the market, among products known as "Azure Active Directory", "Google Sign-In", "okta", etc. The customer adopted identity provider then dictates what information is passed on to software and applications, and is not under control by, the cloud provider.

Besides, OIDC as well as SAML protocols, are not particularly well designed to delegate the management of user authorizations. At best they share metadata that may be used by the corresponding software or application to categorize connected users. Yet these metadata may be used differently from one software or application to the other, and the use of authentication factors may not be uniformly, or even systematically, implemented by them. This is yet another aspect that is not under control by the cloud provider, since as mentioned, the source code of the corresponding software or application may not be available.

There is therefore, in this environment, the need for a method and system of unified access, provided by the cloud provider to its customer, and enabling, for any identity provider chosen by the customer, and all software or applications hosted by the cloud provider and consumed by users of the customer's, a central management by the customer, of authorizations associated with user roles, for all users, and for all software or applications hosted by the cloud provider and consumed by the users.

Further, the need may extend to uniform management of contextual information accompanying a connection for all users, for all consumed software and applications. For example, contextual information may include the location of a user connection, indications of a machine or network used for the connection, a time of connection, etc. . . . For example, a customer may be able to grant access to certain software and applications hosted by the cloud provider, to users using a range of trusted IP addresses only, or during certain time periods only, etc.

It is to be noted that, beyond this particular environment of a cloud provider, the identified need for unified access may also arise in any organization that is running a multiplicity of software or applications on its own managed servers, accessed by a multiplicity of internal users.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art. In particular, various aspects of the present technology provide a method for providing, by a cloud provider to a first customer, a unified access by a user of the first customer to a Service Provider hosted by the cloud provider and to be consumed by the user, wherein the first customer establishes a trusted relationship with a first Identity Provider, the method comprising:

populating, by an administrator of the first customer through an API, a Policy Register with a first policy associated with the user, comprising a first approved role for the user in relation to consumption of the Service Provider; and upon a user request to login to the Service Provider:
delegating, by the Service Provider the user authentication and authorization to a Unified Access provider managed by the cloud provider, through either OIDC or SAML federation;
delegating, by the Unified Access provider the user authentication to the first Identity Provider, through either OIDC or SAML federation;
receiving, by the Unified Access provider:
a user identity information authenticated by the first Identity Provider based on information associated with the login user request; and
the first policy from the Policy Register;
adapting, by the Unified Access provider the received user identity information so as to include the first approved role for the user; and
sending, by the Unified Access provider the adapted user identity information to the Service Provider.

In aspects of the method of the present technology, the API is configured so that it raises an alert if the administrator of the first customer attempts to populate the Policy Register with a policy associated with the user, comprising an approved role for the user which is not recognized by the Unified Access provider.

In other aspects of the method of the present technology, the first policy associated with the user further comprises contextual information, and the method further comprises:
- deriving a context from the receiving, by the Unified Access provider the user identity information;
- comparing the derived context with the contextual information; and
- adapting, by the Unified Access provider the received user identity information so as to include the first approved role for the user only if the derived context and the contextual information match.

In yet other aspects of the method of the present technology, the contextual information includes one of the conditions relative to the user request to login to the Service Provider, between:
- multifactor verification of the user request through sms;
- the user request being made from a predetermined IP address; and
- the user request being made at, before or after a predetermined date.

In yet other aspects of the method of the present technology, a second customer establishes a trusted relationship with a second Identity Provider, and the method further comprises:
- populating, by an administrator of the second customer through the API, the Policy Register with a second policy associated with users of the first customer, comprising a second approved role for the users of the first customer in relation to consumption of the Service Provider;
- receiving, by the Unified Access provider the second policy from the Policy Register; and
- adapting, by the Unified Access provider the received user identity information so as to include the intersect between the first and second approved roles for the user.

Further, various aspects of the present technology provide a system for providing, by a cloud provider to a first customer, a unified access by a user of the first customer to a Service Provider hosted by the cloud provider and to be consumed by the user, the first customer having established a trusted relationship with a first Identity Provider, the system comprising a Unified Access provider) managed by the cloud provider, comprising:
- a Policy Register configured to be populated, by an administrator of the first customer through an API, with a first policy associated with the user, comprising a first approved role for the user in relation to consumption of the Service Provider;
- a first Federation Connector configured to, upon a user request to login to the Service Provider, enable delegating, by the Service Provider the user authentication and authorization to a Role Adaptor, through either OIDC or SAML federation;
- a second Federation Connector configured to, upon the user request to login to the Service Provider, enable delegating, by the Role Adaptor the user authentication to the first Identity Provider, through either OIDC or SAML federation;
the Role Adaptor being configured to:
- receive a user identity information authenticated by the first Identity Provider based on information associated with the login user request;
- receive the first policy from the Policy Register;
- adapt the received user identity information so as to include the first approved role for the user; and
- send the adapted user identity information to the Service Provider.

In other aspects of the system of the present technology, the API is configured so that it raises an alert if the administrator of the first customer attempts to populate the Policy Register with a policy associated with the user, comprising an approved role for the user which is not recognized by the Role Adaptor.

In yet other aspects of the system of the present technology, the first policy associated with the user further comprises contextual information, and the Role Adaptor is further configured to:
- derive a context from the receiving the user identity information;
- compare the derived context with the contextual information; and
- adapt the received user identity information so as to include the first approved role for the user only if the derived context and the contextual information match.

In yet other aspects of the system of the present technology, the contextual information includes one of the conditions relative to the user request to login to the Service Provider, between:
- multifactor verification of the user request through sms;
- the user request being made from a predetermined IP address; and
- the user request being made at, before or after a predetermined date.

In yet other aspects of the system of the present technology, a second customer establishes a trusted relationship with a second Identity Provider, wherein:
- the Policy Register is further configured to be populated, by an administrator of the second customer through the API, with a second policy associated with users of the first customer, comprising a second approved role for the users of the first customer in relation to consumption of the Service Provider; and
- the Role Adaptor is further configured to:
  - receive the second policy from the Policy Register; and
  - adapt the received user identity information so as to include the intersect between the first and second approved roles for the user.

Further yet, various aspects of the present technology provide a computer-readable medium comprising instructions causing a computing system to perform the steps of a method for providing, by a cloud provider to a first customer, a unified access by a user of the first customer to a Service Provider (101$_i$) hosted by the cloud provider and to be consumed by the user, wherein the first customer establishes a trusted relationship with a first Identity Provider, the steps of the method comprising, upon a user request to login to the Service Provider:
- delegating, by the Service Provider the user authentication and authorization to a Unified Access provider managed by the cloud provider, through either OIDC or SAML federation;
- delegating, by the Unified Access provider (100) the user authentication to the first Identity Provider, through either OIDC or SAML federation;
- receiving, by the Unified Access provider:
  - a user identity information authenticated by the first Identity Provider based on information associated with the login user request; and a first policy associated with the user, from the Policy Register, comprising a first approved role for the user in relation to consumption of the Service Provider;

adapting, by the Unified Access provider the received user identity information so as to include the first approved role for the user; and sending, by the Unified Access provider the adapted user identity information to the Service Provider.

In the context of the present description, unless expressly provided otherwise, a "processor" may refer, but is not limited to, any type of "computing system", "electronic device", "computer-based system", "controller unit", "monitoring device", "server" and/or any combination thereof appropriate to the relevant task at hand, in relation to receiving, storing, processing, and/or forwarding data.

In the context of the present specification, the expression "FPGA" is intended to include Field Programmable Gate Array computing systems, available on the market at the time of filing this patent application, such as references Xilinx VU9P, or Intel Stratix V, and any subsequent equivalent technologies becoming available, regardless of their name, consisting in computing system hardware programmable with software.

In the context of the present description, a "processor" may include a single dedicated processor, a single shared processor, or a plurality of individual processors, some of which may be shared. A "processor" may be a general purpose processor, such as a central processing unit (CPU), a processor dedicated to a specific purpose, or a processor implemented in a FPGA. Other hardware and software, conventional and/or custom, may also be included in a "processor".

In the context of the present description, unless expressly provided otherwise, the expression "memory" is intended to include Random Access storage systems, available on the market at the time of filing this patent application, and any subsequent equivalent technologies becoming available, regardless of their name, consisting in computing system media for storing digital information. An example of such memory may be a Quad Data Rate (QDR) Static Random Access Memory (SRAM).

In the context of the present description, the functional steps shown in the figures, may be provided through the use of dedicated hardware, as well as hardware capable of executing software in association with appropriate software.

Still in the context of the present description, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present description, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale. Finally, elements that are identical from one drawing to the other bear the same numeral reference across drawings.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some aspects of the present technology, the processor may be a general purpose processor, such as a central processing unit (CPU) or a processor dedicated to a specific purpose, such as a digital signal processor (DSP). In the aforementioned, explicit use of the term a «processor» should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that «module» may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Figure 1:
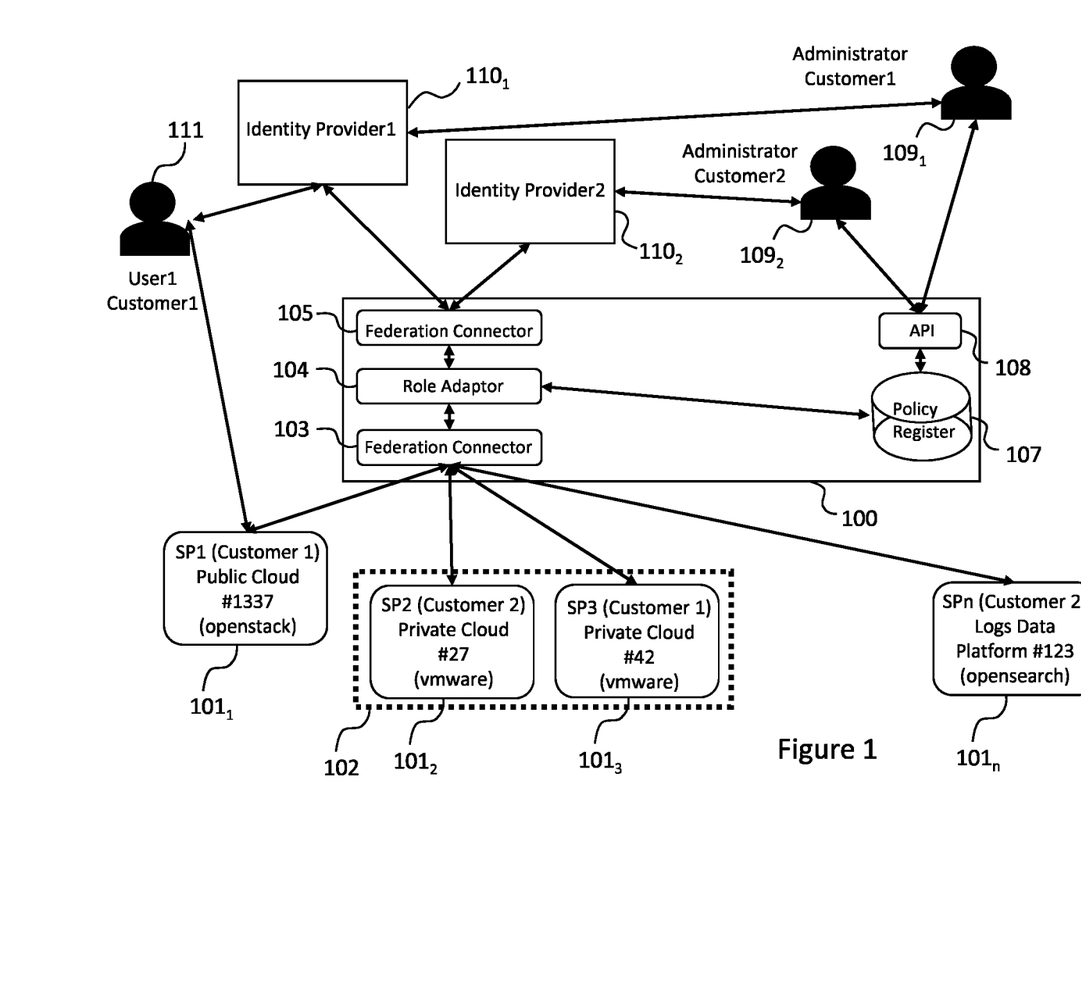
FIG. 1 depicts a unified access system and its environment according to the present technology.

Referring to FIG. 1, there is depicted a unified access system and its environment according to the present technology.

A number of hosted software and application instances $101_{1, \ldots n}$ are available for users of a customer to access and run. They are defined as Service Providers, $SP_{1, \ldots n}$, to the extent such software and applications are compatible with SSO. Two instances or more of the same SP (102) may be made available. For example, such $SP_{S1, \ldots n}$, may be instances of software and applications known as Vmware ($101_2$, $101_3$), Openstack ($101_1$), Opensearch ($101_n$), etc.

Each customer is a tenant to one or more of the SPs $101_{1, \ldots n}$ instances. For example, a Customer1 may be a tenant to SP1 and SP3, while a Customer2 may be tenant to SP2 and $SP_n$.

User authentication and authorization is delegated by the SPs $101_{1, \ldots n}$ according to the present technology, to a Unified Access provider 100. The Unified Access provider 100 in turn delegates user authentication to an identity provider. Each customer may use its own identity provider, for example Identity Provider1 $110_1$ for Customer1, and Identity Provider1 $110_2$ for Customer2. The choice of identity provider is imposed by the customer to the cloud provider and the Unified Access provider 100. Each of Customer1 and Customer2 is a tenant in the Unified Access provider 100. An Administrator Customer1 $109_1$ and an Administrator Customer2 $109_2$, may interact with respectively one of the Identity Providers $110_1$ and $110_2$, and an API 108, as detailed below. An Administrator for a Customer in this context, may for example be a person who holds a system administrator role with the enterprise of the Customer, with sufficient knowledge of the enterprise directory service and identity provider and federation configurations.

The Unified Access provider 100 establishes a trusted relationship with both the Identity Providers $110_1$ and $110_2$ through a Federation Connector 105 on the one hand, and is delegated user authentication and authorization by the SPs $101_{1, \ldots n}$ through a Federation Connector 103 on the other hand. Each of the Federation Connectors 105 and 103 may be compatible with one of, or both of, OIDC and SAML.

A user of Customer1, User1 111 establishes a trusted relationship with the Identity Providers $110_1$, and may request login for example with SP1 $101_1$. It will be apparent to the person skilled in the art, that the teachings herein equally apply to a much larger plurality of customers, administrators and identity providers than the two that are represented FIG. 1.

To achieve such a delegation to the system according to the present technology, a Role Adaptor 104 is communicably connected to both Federation Connectors 105 and 103, and in addition, to a Policy Register 107.

It is to be noted that the Federation Connector 105 is able to identify the respective Identity Provider1 $110_1$ and Identity Provider2 $110_2$, and to convey to the Role Adaptor 104, the information of which customer, in this case between Customer1 and Customer2, User1 111 belongs to.

The Policy Register 107 may be populated with data by the Administrators Customer1 $109_1$, and Customer2 $109_2$, through the API 108. The API 108 may for example be an HTTP API.

The person skilled in the art will recognize that the functional blocks represented on FIG. 1 may be implemented and integrated in different ways, still within the scope of the present technology. For example, in implementations, more or less of the functionality of interfacing with/using federation protocols OIDC or SAML, or of the functionality provided by API 108 and/or Policy Register 107, may be implemented/integrated within the Unified Access provider 100. FIG. 1 is merely a logical representation of functions performed by the present technology.

The system operation according to the present technology may be summarized as follows:

a Customer Administrator1 (for example), on account of a customer managing a service provider, populates policies for SPs consumed by users of the customer into the Policy Register 107, and provides the Identity Provider1 (for example); and upon request on the part of a user of the customer to login to a given SP:

the given SP delegates user authentication and authorization to the Unified Access provider 100 through OIDC or SAML federation; and the Unified Access provider 100:
   delegates user authentication to the Identity Provider1 through OIDC or SAML federation; and
   invokes the Role Adaptor 104 to:
      obtain user role information for the given SP through the populated Policy Register 107; and
      manage user authorization with the given SP, by associating the obtained user role information with a user role recognized by the SP;
such that, when the user attempts an operation with the given SP, the given SP may decide whether such operation falls within the scope of operations permitted under a user role recognized by the SP.

Figure 2:
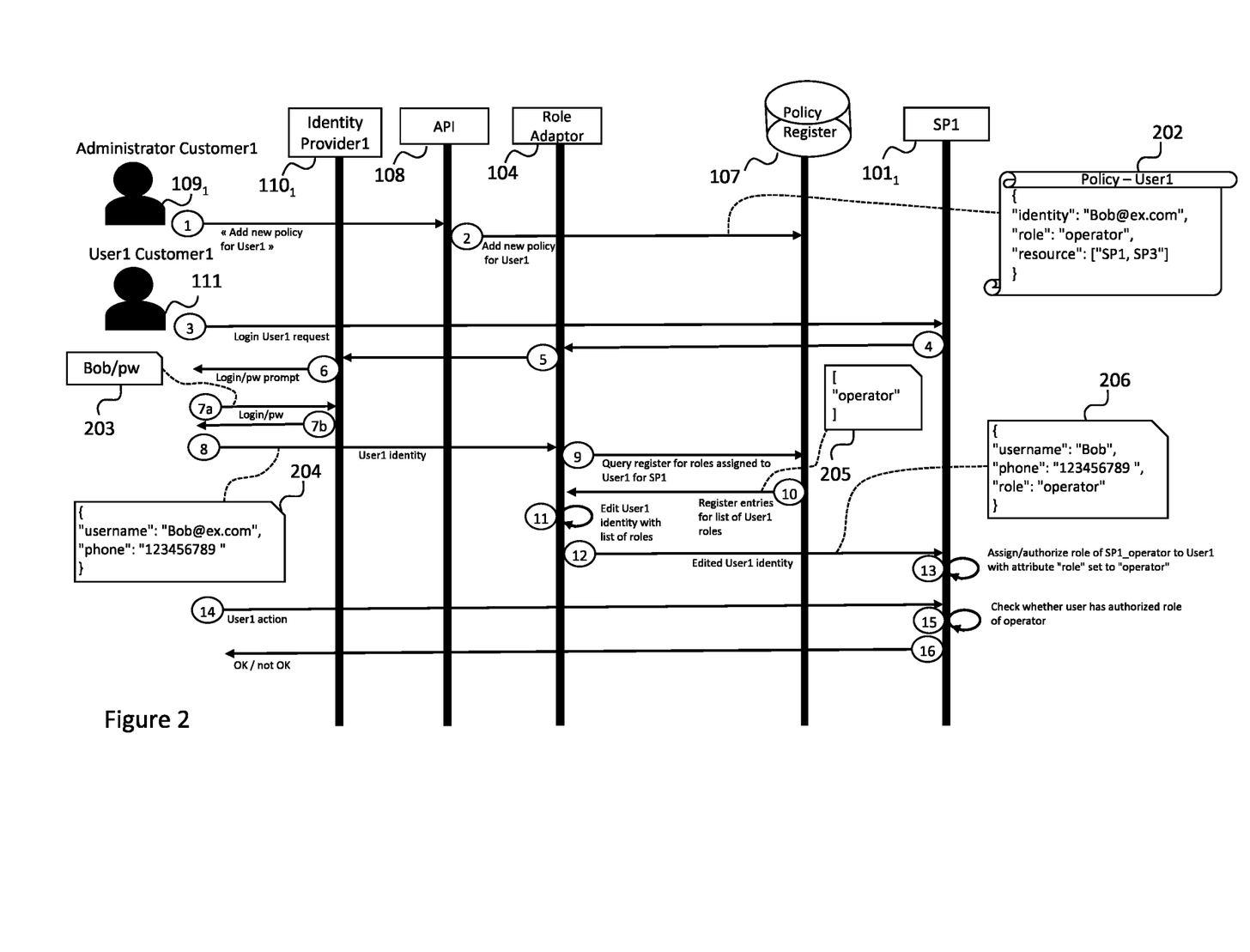
FIG. 2 illustrates a workflow of steps in a particular example of an administrator and a user using the unified access system according to the present technology.

FIG. 2 illustrates a workflow of steps in a particular example of an administrator and a user using the unified access system according to the present technology. Workflow steps are numbered 1 to 16 hereafter:

At workflow step 1, the Administrator $109_1$ may initiate with API 108 a request of having to add a new Policy 202 for a User1 of Customer1, and provides the details of policy.

At workflow step 2, the API 108 formats the received request from Administrator $109_1$, and stores the new Policy into the Policy Register 107. Different ways may be devised by the person skilled in the art of implementing the API 108 and/or the Policy Register 107, and/or the format of the storage for the policies, yet without departing from the teachings of the present description.

In the particular illustration of FIG. 2, Policy 202 comprises:
   a user identity under the form of an email address, for example: "Bob@ex.com";
   a role authorized for such a user, for example: "operator"; and
   a list of SPs $101_{1, \ldots, n}$ for which Policy 202 applies, for example: [SP1; SP3].

It will be apparent to the person skilled in the art that both Policy 202 may optionally include other types of information, such as login contextual information (as more fully described below), and/or other formats for the information. For example, the user identity may not be an email address, but such other unique identifier as supported by the Identity Provider1 $110_1$.

At workflow step 3, User1 of Customer1 111 attempts to login to SP1 $101_1$, for example providing to SP1 $101_1$ a login user request.

At workflow step 4, SP1 $101_1$ delegates to the Role Adaptor 104 through a federation protocol, either OIDC or SAML, user authentication and authorization.

It will be apparent to the person skilled in the art, that to achieve such federation, SP1 $101_1$ delegates through the Federation Connector 103 of FIG. 1, which is not represented on FIG. 2 for purposes of simplification of the representation.

At workflow step 5, the Role Adaptor 104 delegates user authentication to the Identity Provider1 $110_1$ through a federation protocol, either OIDC or SAML (it does not have to be the same as the federation protocol under which SP1 $101_1$ delegated above to the Role Adaptor 104).

It will be apparent to the person skilled in the art, that to achieve such federation, Role Adaptor 104 delegates through the Federation Connector 105 of FIG. 1, which is not represented on FIG. 2 for purposes of simplification of the representation.

At workflow step 6, the Identity Provider1 $110_1$ prompts the User1 111 to enter authentication parameters, for example login and password. Authentication parameters are as dictated by the Identity Provider1 $110_1$ that has been chosen by Customer1.

At workflow step 7a, the User1 111 enters authentication parameters 203, for example: "Bob" and a password.

The Identity Provider1 $110_1$ computes such entries and perform steps (not represented) as is known to the person skilled in the art, to confirm authentication.

At workflow step 7b, the Identity Provider1 $110_1$ returns to the User1 111, once authenticated, user identity information it infers from the authentication parameters 203. At workflow step 8, the User1 111 provides to the Role Adaptor 104, information 204 based on the user identity information, for example:
   a user name, for example: "Bob@ex.com"; and
   metadata associated with such user, for example its phone number: "123456789".

At workflow step 9, the Role Adaptor 104 queries the Policy Register 107 for any roles associated with the user name "Bob@ex.com" for SP1 $101_1$.

At workflow step 10, the Policy Register 107 returns to the Role Adaptor 104 any information stored in it about any roles associated with the user name "Bob@ex.com" for SP1 $101_1$, for example information 205: "operator".

At workflow step 11, the Role Adaptor 104 computes the received information so as to adapt it for consumption by SP1 $101_1$. In the simplified represented case, the adaptation consists in appending information received from the Policy Register 107, to information received from the Identity Provider1 $110_1$, more particularly in this case, editing User1 identity by combining information 204 and information 205.

At workflow step 12, the Role Adaptor 104 returns (in return to the request at workflow step 4 above) the adapted information to SP1 $101_1$. For example, information 206 as edited User1 identity, may contain:
   the user name, for example: "Bob";
   metadata associated with such user, that may be consumed by SP1 $101_1$, for example its phone number: "123456789"; and
   the associated permitted role, for example: "operator".

At workflow step 13, SP1 $101_1$ uses the information returned by the Role Adaptor 104 to assign/authorize certain roles specific to SP1 $101_1$ in connection with User1 111.

The system is now ready for operation.

At workflow step 14, the User1 111 attempts an operation with SP1 $101_1$.

At workflow step 15, such attempt is checked, and whether there is a match between the type of the attempted operation, and the type(s) of operation User1 is authorized with SP1 $101_1$.

For example in this case, whether the attempted operation is of the "operator" type.

At workflow step 16, the SP1 $101_1$, computes the operation or rejects the attempted operation depending on the check.

It will be apparent to the person skilled in the art that, according to federation protocols OIDC and SAML, an identity provider such as Identity Provider1 $100_1$, provides a standard set of minimal information related to user identity, and that further, the customer administrator, such as Administrator Customer1 $109_1$, configures the Identity Provider1 $100_1$ so that the format of the set of information 204 provided by User1 1111 at workflow step 8 matches the format of the set of information 202 that the Administrator Customer1 $109_1$ entered as policy in the Policy Register 107 at workflow step 2. For example, the Administrator Customer1 $109_1$ will arrange that the user identity as returned by the User1 111 and as written in the policy, be under the same email format (ex "Bob@ex.com").

Optionally, a security system may be made part of the present technology so as to avoid that the Administrator enters as part of the policy in the Policy Register 107 (workflow step 2), a role that is not recognized by the SP it is associated with in the policy.

In embodiments, the API 108 is configured by the Role Adaptor 104, for each customer, with a list of recognized roles for all the SPs $101_{1, \ldots, n}$ managed by such customer, such that if the Administrator attempts to enter a role that is not on the list, an error flag is raised.

Figure 3:
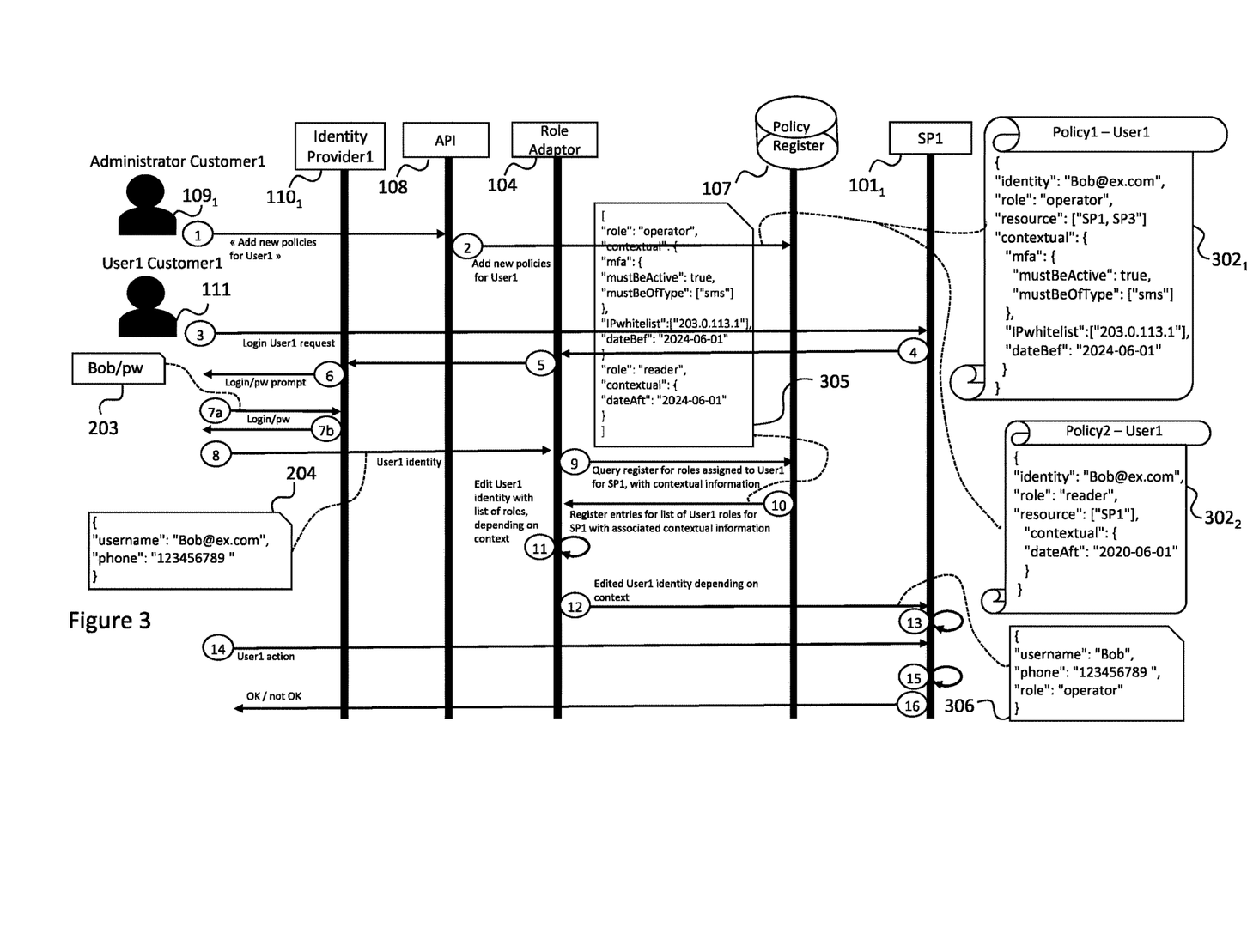
FIG. 3 illustrates a workflow of steps in another example of an administrator and a user using the unified access system having contextual information capabilities according to the present technology.

FIG. 3 illustrates a workflow of steps in a particular example of an administrator and a user using the unified access system having contextual information capabilities according to the present technology. Workflow steps are numbered 1 to 16 hereafter:

At workflow step 1, the Administrator $109_1$ may initiate with API 108 a request of having to add new Policies $302_i$ for a User1 of Customer1, and provides the policy details.

At workflow step 2, the API 108 formats the received request from Administrator $109_1$, and stores the new Policies $302_i$ into the Policy Register 107.

In the particular illustration of FIG. 3, Policies $302_1$ and $302_2$ comprise respectively:
- a user identity under the form of an email address, for example: "Bob@ex.com";
- a role authorized for such a user, for example respectively: "operator" and "reader";
- a list of SPs $101_{1, \ldots, n}$ for which Policies $302_1$ and $302_2$ apply, for example respectively: [SP1; SP3] and [SP1]; and
- a list of contextual information or conditions related to the context in which the user may be requesting access to the SPs $101_{1, \ldots, n}$, for example respectively:
  multifactor verification user access through sms, plus access from IP address 203.0.113.1, plus a date of user access predating Jun. 1, 2024; and
  a date of user access postdating Jun. 1, 2024.

It will be apparent to the person skilled in the art that Policies $302_1$ and $302_2$ may include other formats for the information. For example, the user identity may not be an email address, but such other unique identifier as supported by the Identity Provider1 $110_1$.

At workflow step 3, User1 of Customer1 111 attempts to login to SP1 $101_1$, for example providing to SP1 $101_1$ a login user request.

At workflow step 4, SP1 $101_1$ delegates to the Role Adaptor 104 through a federation protocol, either OIDC or SAML, user authentication and authorization.

It will be apparent to the person skilled in the art, that to achieve such federation, SP1 $101_1$ delegates through the Federation Connector 103 of FIG. 1, which is not represented on FIG. 3 for purposes of simplification of the representation.

At workflow step 5, the Role Adaptor 104 delegates user authentication to the Identity Provider1 $110_1$ through a federation protocol, either OIDC or SAML (it does not have to be the same as the federation protocol under which SP1 $101_1$ delegated above to the Role Adaptor 104).

It will be apparent to the person skilled in the art, that to achieve such federation, Role Adaptor 104 delegates through the Federation Connector 105 of FIG. 1, which is not represented on FIG. 3 for purposes of simplification of the representation.

At workflow step 6, the Identity Provider1 $110_1$ prompts the User1 111 to enter authentication parameters, for example login and password. Authentication parameters are as dictated by the Identity Provider1 $110_1$ that has been chosen by Customer1.

At workflow step 7a, the User1 111 enters authentication parameters 203, for example: "Bob" and a password.

The Identity Provider1 $110_1$ computes such entries and performs steps (not represented) as is known to the person skilled in the art, to confirm authentication.

At workflow step 7b, the Identity Provider1 $110_1$ returns to the User1 111, once authenticated, user identity information it infers from the authentication parameters 203.

At workflow step 8, the User1 111 provides to the Role Adaptor 104, information 204 based on the user identity information, for example:
- a user name, for example: "Bob@ex.com"; and
- metadata associated with such user, for example its phone number: "123456789".

At this point, the Role Adaptor 104 is able to derive (not represented) a context surrounding the providing of information by the User1 111 at workflow step 8. For example, the Role Adaptor 104 may infer the date and time of the providing of information, the IP address used by the User1 111, etc.

At workflow step 9, the Role Adaptor 104 queries the Policy Register 107 for any roles associated with the user name "Bob@ex.com" for SP1 $101_1$, including any associated contextual information or conditions.

At workflow step 10, the Policy Register 107 returns to the Role Adaptor 104 any information stored in it about any roles in any Policy $302_i$ for the user name "Bob@ex.com" for SP1 $101_1$, together with any associated contextual information or conditions. For example information 305 may include:
- for the role of "operator", a contextual information consisting of a multifactor verification user access through sms, plus a user access from IP address 203.0.113.1, plus a date of user access predating Jun. 1, 2024; and
- for the role of "reader", a contextual information consisting of a date of access postdating Jun. 1, 2024.

At workflow step 11, the Role Adaptor 104 computes the received information. Based on the context derived upon workflow step 8, it does a comparison of such derived context with the contextual information or conditions in information 305. If the derived context matches the contextual information or conditions for at least one particular role, the Role Adaptor 104 then adapts the User1 identity for consumption by SP1 $101_1$. In the particular case illustrated, the context derived from the user request at workflow step 8 included that:
- the user login be verified through multifactor verification user access through sms;
- the user request be made from IP address 203.0.113.1; and
- the user request be made at a date prior to Jun. 1, 2024.

Assuming the derived context matches the contextual information or conditions for a role of "operator", the adaptation thus consists in editing User1 identity by combining information 204 and the role of "operator".

Any other role would have also been included in the adaptation, for which the derived context matches the contextual information or conditions.

At workflow step 12, the Role Adaptor 104 returns (in return to the request at workflow step 4 above) the adapted information to SP1 $101_1$. For example, information 306 may contain:

the user name, for example: "Bob@ex.com";
metadata associated with such user, that may be consumed by SP1 $101_1$, for example its phone number: "123456789"; and
the associated permitted role, for example: "operator".

At workflow step 13, SP1 $101_1$ uses the information returned by the Role Adaptor 104 to assign/authorize certain roles specific to SP1 $101_1$ in connection with User1 111.

The system is now ready for operation.

At workflow step 14, the User1 111 attempts an operation with SP1 $101_1$.

At workflow step 15, such attempt is checked, and whether there is a match between the type of the attempted operation, and the type of operation User1 is authorized with SP1 $101_1$. For example in this case, whether the attempted operation is of the "operator" type.

At workflow step 16, the SP1 $101_1$, computes the operation or rejects the attempted operation depending on the check.

Figure 4A:
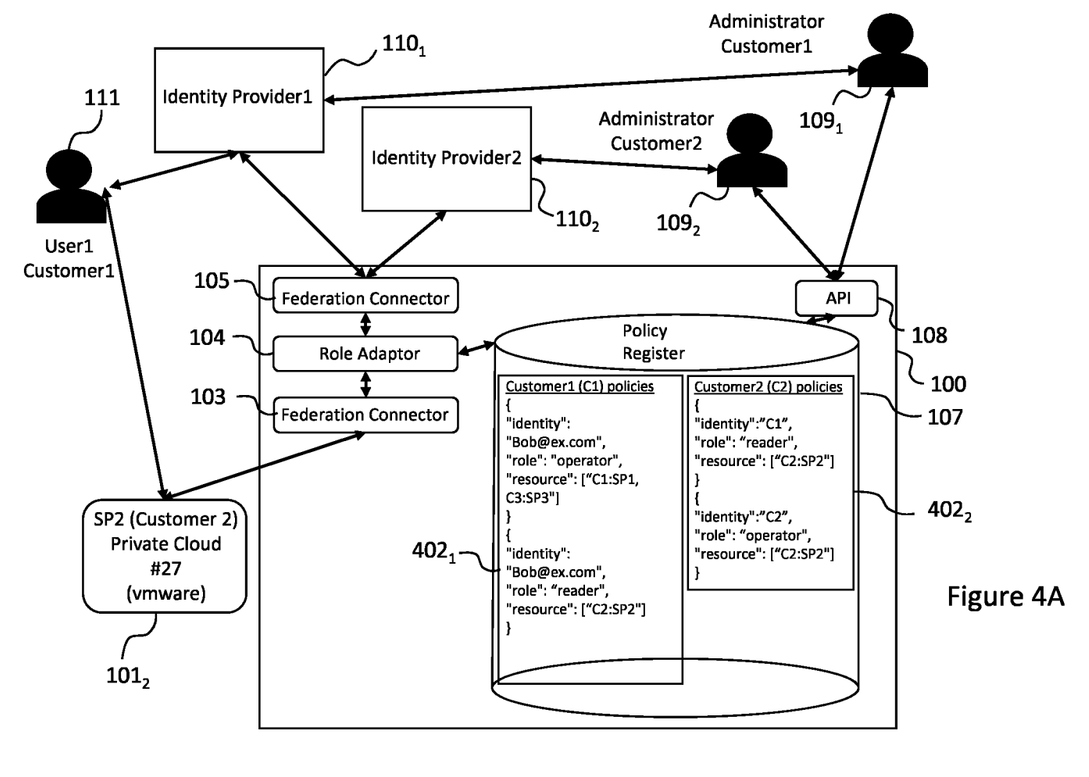
FIG. 4A depicts the unified access system and its environment according to the present technology in the particular example of a user from a customer accessing a service provider managed by another customer.

Optionally, another delegation system may be made part of the present technology so as enable a first customer managing certain or all of SPs $101_{1, \ldots, n}$, to allow users of a second customer to access such SPs managed by the first customer. FIG. 4A depicts an embodiment of the present technology enabling access by a user of a given customer, to service providers managed by another customer. In this example, User1 111 of Customer1 attempts to access SP2 $101_2$ managed by Customer2. In such a case:
an administrator for Customer 1 will have entered (not represented, but as in FIG. 1 for example) in the Policy Register 107 a policy $402_1$ for Customer1; and
an administrator for Customer2 will have entered (not represented, but as in FIG. 1 for example) in the Policy Register 107 a policy $402_2$ for Customer2.

As the Federation Connector 105 is able to identify the respective Identity Provider1 $110_1$ and Identity Provider2 $110_2$, and to convey to the Role Adaptor 104, the information of which customer, in this case between Customer1 and Customer2, User1 111 belongs to, the Role Adaptor 104 may thus associate a customer identification, for example a prefix, such as respectively "C1" or "C2", to be used in policies entered into Policy Register 107, for example in relation to "identity" or "resource" fields.

In the particular illustration of FIG. 4A, Customer1 policy $402_1$ comprises:
a user identity under the form of an email address, for example: "Bob@ex.com";
a role authorized for such a user, for example: "operator"; and
a list of SPs $101_{1, \ldots, n}$ for which Policy $402_1$ applies, including as the case may be, managed by another customer of the service provider; in this case the list is [C1: SP1; C1: SP3], indicating that "Bob@ex.com" may, as an operator, access the SPs $101_1$ and $101_3$ that are managed by Customer1.

Customer1 policy $402_1$ further comprises:
a user identity under the form of an email address, for example: "Bob@ex.com";
a role authorized for such a user, for example: "reader"; and
a list of SPs $101_{1, \ldots, n}$ for which Policy $402_1$ applies, including as the case may be, managed by another customer of the service provider; in this case the list is [C2:SP2], indicating that "Bob@ex.com" may, as a reader, access the SP2 $101_2$ that is managed by Customer2 (subject to additional conditions as described below).

Still in the particular illustration of FIG. 4A, Customer2 policy $402_2$ comprises:
a Customer identity, for example "C1" (i.e. pointing to all users of Customer1);
a role authorized for such users, for example: "reader"; and
a list of SPs $101_{1, \ldots, n}$ for which Policy $402_2$ applies, including as the case may be, managed by any customer of the service provider; in this case the list is [C2:SP2], indicating that users of Customer1 may, as readers, access the SP2 $101_2$ that is managed by Customer2.

Customer2 policy $402_2$ further comprises:
a Customer identity, for example: "C2" (i.e. pointing to all users of Customer2);
a role authorized for such users, for example: "operator"; and
a list of SPs $101_{1, \ldots, n}$ for which Policy $402_2$ applies, including as the case may be, managed by any customer of the service provider; in this case the list is [C2:SP2], indicating that users of Customer2 may, as operators, access the SP2 $101_2$ that is managed by Customer2.

It will be apparent to the person skilled in the art that both Policies $402_1$ and $402_2$ may include other types of information, such as login contextual information (as described above), and/or other formats for the information. For example, the user identity may not be an email address, but such other unique identifier as supported by the Identity Providers $110_1$ and $110_2$.

Figure 4B:
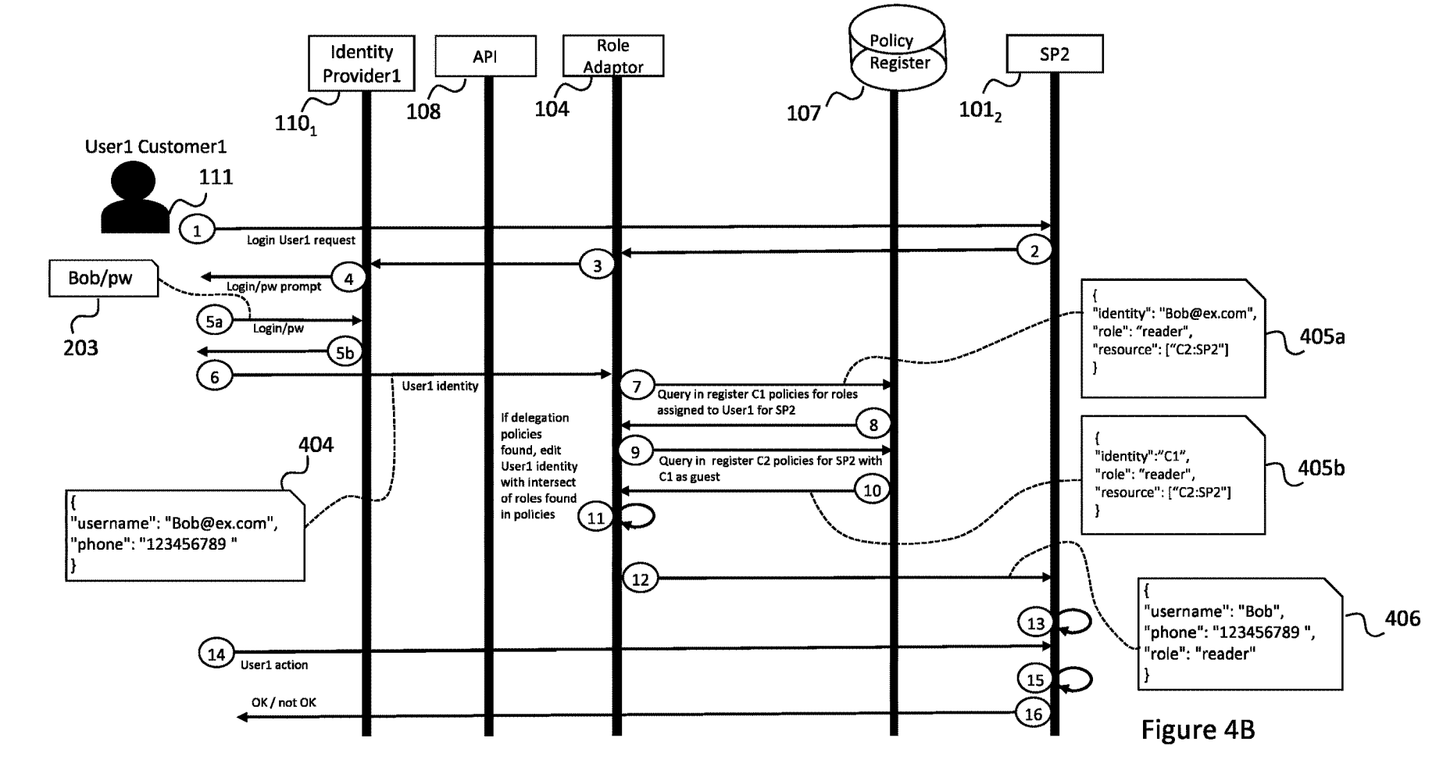
FIG. 4B illustrates a workflow of steps in the example of a user from a customer accessing a service provider managed by another customer.

FIG. 4B illustrates a workflow of steps in a particular example of a user of a customer using the unified access system according to the present technology to access a service provider managed by another customer. Workflow steps are numbered 1 to 16 hereafter:

At workflow step 1, User1 of Customer1 111 attempts to login to SP2 $101_2$ managed by Customer2, for example providing to SP2 $101_2$ a login user request.

At workflow step 2, SP2 $101_2$ delegates to the Role Adaptor 104 through a federation protocol, either OIDC or SAML, user authentication and authorization.

It will be apparent to the person skilled in the art, that to achieve such federation, SP2 $101_2$ delegates through the Federation Connector 103 of FIG. 1, which is not represented on FIG. 4B for purposes of simplification of the representation.

At workflow step 3, the Role Adaptor 104 delegates user authentication to the Identity Provider1 $110_1$ (the Identity Provider of Customer 1) through a federation protocol, either OIDC or SAML (it does not have to be the same as the federation protocol under which SP2 $101_2$ delegated above to the Role Adaptor 104).

It will be apparent to the person skilled in the art, that to achieve such federation, Role Adaptor 104 delegates through the Federation Connector 105 of FIG. 1, which is not represented on FIG. 4B for purposes of simplification of the representation.

At workflow step 4, the Identity Provider1 $110_1$ prompts the User1 111 to enter authentication parameters, for example login and password. Authentication parameters are as dictated by the Identity Provider1 $110_1$ that has been chosen by Customer1.

At workflow step 5a, the User1 111 enters authentication parameters 203, for example: "Bob" and a password.

The Identity Provider1 $110_1$ computes such entries and perform steps (not represented) as is known to the person skilled in the art, to confirm authentication.

At workflow step 5b, the Identity Provider1 $110_1$ returns to the User1 111, once authenticated, user identity information it infers from the authentication parameters 203. At workflow step 6, the User1 111 provides to the Role Adaptor 104, information 404 based on the user identity information, for example:

a user name, for example: "Bob@ex.com"; and
metadata associated with such user, for example its phone number: "123456789".

At workflow step 7, the Role Adaptor 104 queries the Policy Register 107 for any roles associated with the user name "Bob@ex.com" for SP2 101$_2$ in the Customer1 Policy 402$_1$.

At workflow step 8, the Policy Register 107 returns to the Role Adaptor 104 any information stored in it about any roles associated with the user name "Bob@ex.com" for SP2 101$_2$. For example, it may return information 405$a$, that "Bob@ex.com" is authorized as a "reader" on "C2:SP2" (ie: SP2 101$_2$ managed by Customer2).

If a role on SP2 101$_2$ is found for "Bob@ex.com" in the Customer1 Policy 402$_1$ (computation performed by the Role Adaptor 102 not represented on FIG. 4B), then at workflow step 9, the Role Adaptor 104 queries the Policy Register 107 for any roles associated with any Customer1 user for SP2 101$_2$ in the Customer2 Policy 402$_2$.

At workflow step 10, the Policy Register 107 returns to the Role Adaptor 104 any information stored in it about any roles associated with Customer1 users for SP2 101$_2$. For example, it may return information 405$b$, that Customer1 users are authorized as "reader" on "C2:SP2" (ie: SP2 101$_2$ managed by Customer2).

At workflow step 11, the Role Adaptor 104 computes the information received from the Policy Register 107 at workflow steps 8 and 10: if first roles on SP2 101$_2$ are found for "Bob@ex.com" in the Customer1 policies, and second roles on SP2 101$_2$ are found for Customer1 users in the Customer2 policies, then the Role Adaptor 104 calculates the intersect between the first and second roles. For example, if the first roles are "reader" and "operator", and the second roles are "reader", the intersect will be "reader".

If the intersect is non-null, the Role Adaptor 104 then adapts the User1 identity information for consumption by SP2 101$_2$. In the simplified represented case, the adaptation consists in combining information 204 with the calculated intersect (for example: appending the calculated intersect).

At workflow step 12, the Role Adaptor 104 returns (in return to the request at workflow step 2 above) the adapted information to SP2 101$_2$. For example, information 406 may contain:

the user name, for example: "Bob@ex.com";
metadata associated with such user, that may be consumed by SP1 101$_1$, for example its phone number: "123456789"; and
the associated permitted role, for example: "reader".

It will be apparent to the person skilled in that art that if:
no first role on SP2 101$_2$ is found for "Bob@ex.com" in the Customer1 policies; or
no second role on SP2 101$_2$ is found for Customer1 users in the Customer2 policies; or
there is no intersect between first and second role(s);
then the Role Adaptor may not perform the workflow step 12, and User1 111 may not access SP2 101$_2$ in any capacity.

At workflow step 13, SP2 101$_2$ uses the information returned by the Role Adaptor 104 to assign/authorize certain roles specific to SP2 101$_2$ in connection with User1 111.

The system is now ready for operation.

At workflow step 14, the User1 111 attempts an operation with SP2 101$_2$.

At workflow step 15, such attempt is checked, and whether there is a match between the type of the attempted operation, and the type of operation User1 is authorized with SP2 101$_2$. For example in this case, whether the attempted operation is of the "reader" type.

At workflow step 16, the SP2 101$_2$, computes the operation or rejects the attempted operation depending on the check.

As the person skilled in the art will recognize, the teachings herein in the context of a cloud provider hosting SPs for customers and their users, may be applied to a method and system of unified access, provided by an enterprise to its business units/divisions, and enabling, for any identity provider chosen by the business units/divisions, and all software or applications hosted by the enterprise or by a 3$^{rd}$ party for the enterprise (ex: private cloud) and consumed by users of the business units/divisions', a central management by the enterprise, of authorizations associated with user roles, for all users, and for all enterprise software or applications.

Figure 5:
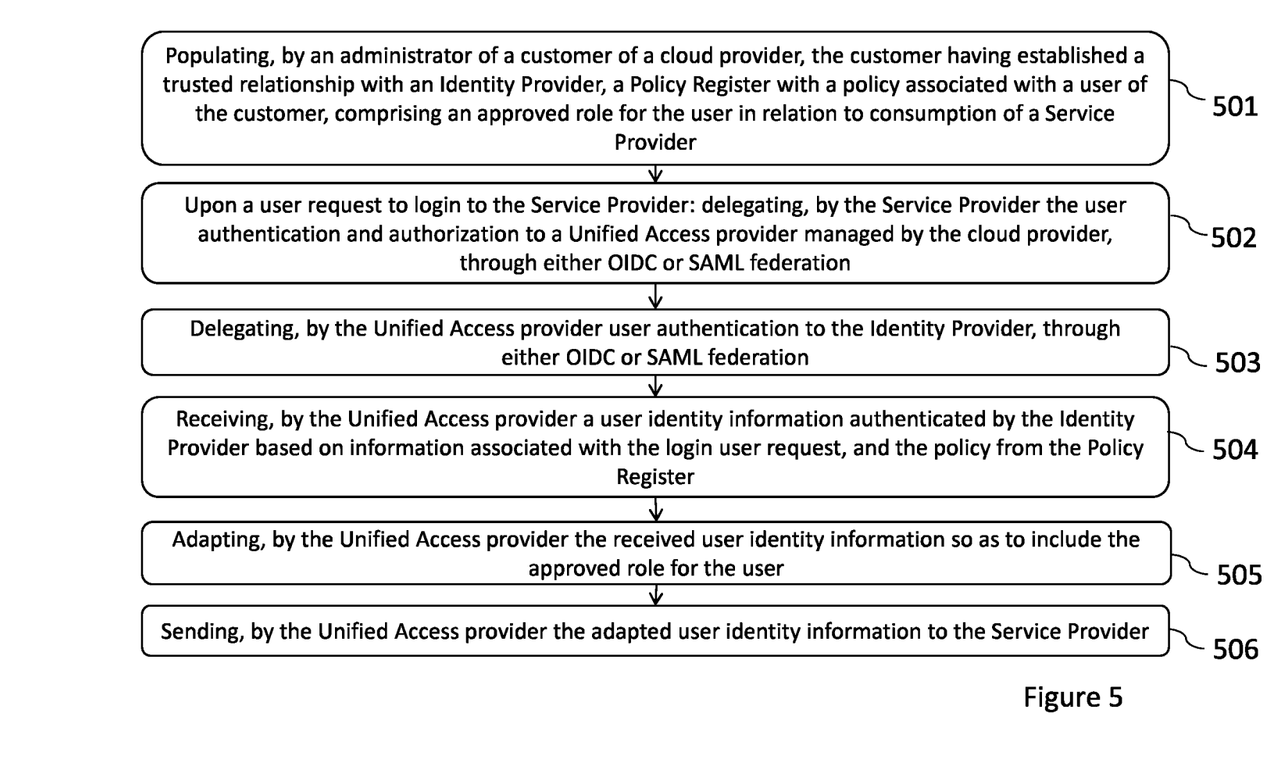
FIG. 5 depicts the sequence of steps in a particular embodiment of the method according to the present technology.

FIG. 5 depicts the sequence of steps in a particular embodiment of the method according to the present technology. The method is described for providing, by a cloud provider to a customer, a unified access by a user (111) of the customer to a Service Provider (101$_i$) hosted by the cloud provider and to be consumed by the user, the customer having established a trusted relationship with an Identity Provider (110$_i$). With step 501, the method more particularly comprises populating, by an administrator (109$_i$) of the customer, a Policy Register (107) with a policy (202, 302) associated with the user, comprising an approved role for the user in relation to consumption of the Service Provider (101$_i$). With step 502, upon a user request to login to the Service Provider (101$_i$), the method comprises delegating, by the Service Provider (101$_i$) the user authentication and authorization to a Unified Access provider (100) managed by the cloud provider, through either OIDC or SAML federation. With step 503, the method further comprises delegating, by the Unified Access provider (100) user authentication to the Identity Provider (110$_i$), through either OIDC or SAML federation. With step 504, the method further comprises yet receiving, by the Unified Access provider (100) a user identity information authenticated by the Identity Provider (110$_i$) based on information associated with the login user request, and the policy from the Policy Register (107). With step 505, the method further comprises yet adapting, by the Unified Access provider (100) the received user identity information so as to include the approved role for the user. Finally, with step 506, the method further comprises sending, by the Unified Access provider (100) the adapted user identity information to the Service Provider (101$_i$).

Figure 6:
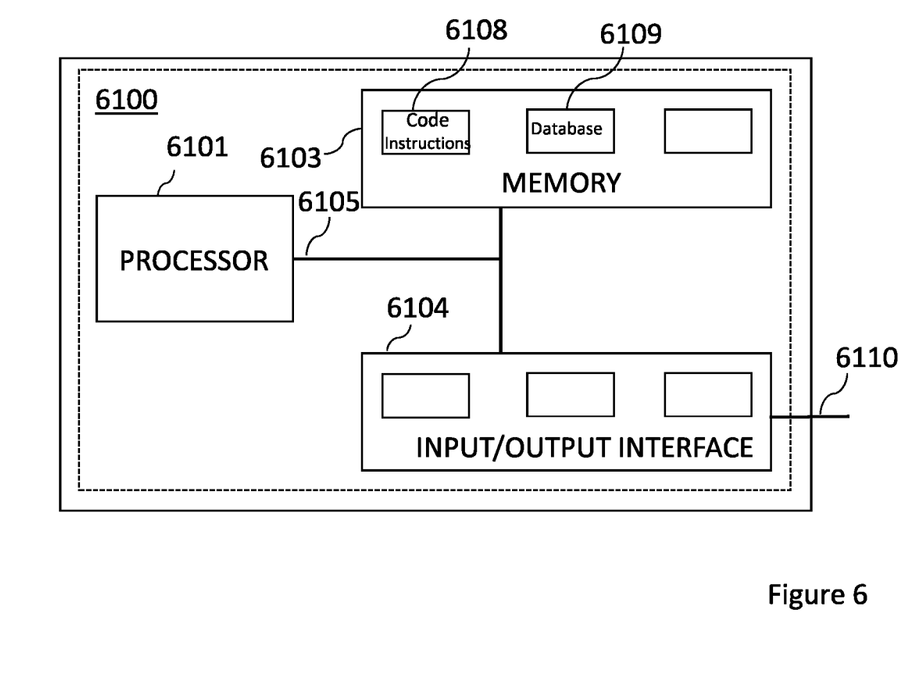
FIG. 6 represents a computing system that may be used as part of the present technology.

FIG. 6 illustrates a computing system that may be used in the present technology, for example in any one of, or a subset of, or all of the functional elements Federation Connector 105, Federation Connector 103, Role Adaptor 104, API 108, or Unified Access provider 100 of FIG. 1. As will be appreciated by the person skilled in the art, such computing system may be implemented in any other suitable hardware, software, and/or firmware, or a combination thereof, and may be a single physical entity, or several separate physical entities with a distributed functionality.

In some aspects of the present technology, the Computing system 6100 may comprise various hardware components including one or more single or multi-core processors collectively represented by a Processor 6101, a Memory 6103 and an Input/output interface 6104. In this context, the Processor 6101 may or may not be included in a FPGA. In some other aspect, the Computing system 6100 may be an "off the shelf" generic computing system. In some aspect, the Computing system 6100 may also be distributed amongst multiple systems. The Computing system 6100 may also be specifically dedicated to the implementation of the present technology. As a person in the art of the present technology may appreciate, multiple variations as to how the Computing system 6100 is implemented may be envisioned without departing from the scope of the present technology.

Communication between the various components of the Computing system 6100 may be enabled by one or more internal and/or external Buses 6105 (e.g. a PCI bus, universal serial bus, IEEE 1394 "Firewire" bus, SCSI bus, Serial-ATA bus, ARINC bus, etc.), to which the various hardware components are electronically coupled.

The Input/output interface 6104 may enable networking capabilities such as wire or wireless access. As an example, the Input/output interface 6104 may comprise a networking interface such as, but not limited to, a network port, a network socket, a network interface controller and the like. Multiple examples of how the networking interface may be implemented will become apparent to the person skilled in the art of the present technology.

The Memory 6103 may store Code instructions 6108, such as those part of, for example, a library, an application, etc. suitable for being loaded into the Memory 6103 and executed by the Processor 6101 for implementing the method and process steps according to the present technology. The Memory 6103 may also store a Database 6109. The person skilled in the art will appreciate that any of the Database 6109, the Code instructions 6108, and generally the Memory 6103, may also physically reside outside of the Computing System 6100, still within the scope of the present technology.

The Input/output interface 6104 may allow Computing System 6100 to be communicably connected to other processors through a Connection 6110.

While the above-described implementations have been described and shown with reference to particular steps performed in a particular order, it will be understood that these steps may be combined, sub-divided, or re-ordered without departing from the teachings of the present disclosure. At least some of the steps may be executed in parallel or in series. Accordingly, the order and grouping of the steps is not a limitation of the present technology. It should further be expressly understood that not all technical effects mentioned herein need to be enjoyed in each and every aspect of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for providing, by a cloud provider to a first customer, a unified access by a user of the first customer to a service provider hosted by the cloud provider, wherein the first customer establishes a trusted relationship with a first identity provider, the method comprising:
   populating, by an administrator of the first customer through an application programming interface (API), a policy register with a first policy associated with the user, comprising a first approved role for the user in relation to the service provider; and
   after receiving a user request to login to the service provider:
      delegating, by the service provider, a user authentication and authorization to a unified access provider managed by the cloud provider, through either OpenID Connect (OIDC) or Security Assertion Markup Language (SAML) federation;
      delegating, by the unified access provider, the user authentication to the first identity provider, through either OIDC or SAML federation;
      receiving, by the unified access provider:
         a user identity information authenticated by the first identity provider based on information associated with the user request to login to the service provider, and
         the first policy from the policy register;
      adapting, by the unified access provider, the received user identity information so as to include the first approved role for the user; and
      sending, by the unified access provider, the adapted user identity information to the service provider.

2. The method of claim 1, further comprising configuring the API so that it raises an alert if the administrator of the first customer attempts to populate the policy register with a policy associated with the user, the policy comprising an approved role for the user which is not recognized by the unified access provider.

3. The method of claim 1, wherein the first policy associated with the user further comprises contextual information, and the method further comprises:
   deriving a context from the receiving, by the unified access provider, the user identity information;
   comparing the derived context with the contextual information; and
   adapting, by the unified access provider, the received user identity information so as to include the first approved role for the user only if the derived context and the contextual information match.

4. The method of claim 3, wherein the contextual information corresponds to:
   multifactor verification of the user request through short message service (SMS);
   the user request being made from a predetermined IP address; or
   the user request being made at, before or after a predetermined date.

5. The method of claim 1, wherein a second customer establishes a trusted relationship with a second identity provider, the method further comprising:
   populating, by an administrator of the second customer through the API, the policy register with a second policy associated with users of the first customer, comprising a second approved role for the users of the first customer in relation to the service provider;
   receiving, by the unified access provider, the second policy from the policy register; and
   adapting, by the unified access provider, the received user identity information so as to include an intersect between the first and second approved roles for the user.

6. A system for providing, by a cloud provider to a first customer, a unified access by a user of the first customer to a service provider hosted by the cloud provider, the first customer having established a trusted relationship with a first identity provider, the system comprising a unified access provider managed by the cloud provider, the system comprising:

a policy register configured to be populated, by an administrator of the first customer through an application programming interface (API), with a first policy associated with the user, comprising a first approved role for the user in relation to the service provider;

a first federation connector configured to, upon a user request to login to the service provider, enable delegating, by the service provider, the user authentication and authorization to a role adaptor through either OpenID Connect (OIDC) or Security Assertion Markup Language (SAML) federation;

a second federation connector configured to, upon the user request to login to the service provider, enable delegating, by the role adaptor, the user authentication to the first identity provider, through either OIDC or SAML federation;

the role adaptor being configured to:
receive a user identity information authenticated by the first identity provider based on information associated with the login user request;
receive the first policy from the policy register;
adapt the received user identity information so as to include the first approved role for the user; and
send the adapted user identity information to the service provider.

7. The system of claim 6, wherein the API is configured so that it raises an alert if the administrator of the first customer attempts to populate the Policy Register with a policy associated with the user, comprising an approved role for the user which is not recognized by the role adaptor.

8. The system of claim 6, wherein the first policy associated with the user further comprises contextual information, and the role adaptor is further configured to:
derive a context from the receiving the user identity information;
compare the derived context with the contextual information; and
adapt the received user identity information so as to include the first approved role for the user only if the derived context and the contextual information match.

9. The system of claim 8, wherein the contextual information corresponds to:
multifactor verification of the user request through short message service (SMS);
the user request being made from a predetermined IP address; or
the user request being made at, before or after a predetermined date.

10. The system of claim 6, wherein a second customer establishes a trusted relationship with a second identity provider, and wherein:
the policy register is further configured to be populated, by an administrator of the second customer through the API, with a second policy associated with users of the first customer, comprising a second approved role for the users of the first customer in relation to the service provider; and
the role adaptor is further configured to:
receive the second policy from the Policy Register; and
adapt the received user identity information so as to include an intersect between the first and second approved roles for the user.

11. The system of claim 6, wherein the API is a hypertext transfer protocol (HTTP) API.

12. A non-transitory computer-readable medium comprising instructions, which, when executed by at least one processor, cause the at least one processor to perform a method for providing, by a cloud provider to a first customer, a unified access by a user of the first customer to a service provider hosted by the cloud provider, wherein the first customer establishes a trusted relationship with a first identity provider, the method comprising, upon a user request to login to the service provider:
delegating, by the service provider, the user authentication and authorization to a unified access provider managed by the cloud provider, through either OpenID Connect (OIDC) or Security Assertion Markup Language (SAML) federation;
delegating, by the unified access provider, the user authentication to the first identity provider, through either OIDC or SAML federation;
receiving, by the unified access provider:
a user identity information authenticated by the first identity provider based on information associated with the user request to login to the service provider, and
a first policy, from the policy register, associated with the user, the first policy comprising a first approved role for the user in relation to the service provider;
adapting, by the unified access provider, the received user identity information so as to include the first approved role for the user; and
sending, by the unified access provider, the adapted user identity information to the service provider.

13. The non-transitory computer-readable medium of claim 12, the method further comprising configuring the API so that it raises an alert if the administrator of the first customer attempts to populate the policy register with a policy associated with the user, the policy comprising an approved role for the user which is not recognized by the unified access provider.

14. The non-transitory computer-readable medium of claim 12, wherein the first policy associated with the user further comprises contextual information, and the method further comprises:
deriving a context from the receiving, by the unified access provider, the user identity information;
comparing the derived context with the contextual information; and
adapting, by the unified access provider, the received user identity information so as to include the first approved role for the user only if the derived context and the contextual information match.

15. The non-transitory computer-readable medium of claim 14, wherein the contextual information corresponds to:
multifactor verification of the user request through short message service (SMS);
the user request being made from a predetermined IP address; or
the user request being made at, before or after a predetermined date.

16. The non-transitory computer-readable medium of claim 12, wherein a second customer establishes a trusted relationship with a second identity provider, the method further comprising:
populating, by an administrator of the second customer through the API, the policy register with a second policy associated with users of the first customer, comprising a second approved role for the users of the first customer in relation to the service provider;
receiving, by the unified access provider, the second policy from the policy register; and adapting, by the unified access provider, the received user identity information so as to include an intersect between the first and second approved roles for the user.

\* \* \* \* \*